United States Patent [19]
Polch et al.

[11] Patent Number: 5,858,509
[45] Date of Patent: Jan. 12, 1999

[54] ATTENUATING VIBRATIONS IN A MOUNTING SHELF FOR MULTIPLE DISK DRIVES

[75] Inventors: Ewaryst Zygmunt Polch, Monument; Chad Everett Dewitt, Colorado Springs; Theodore Ernst Bruning, III, Colorado Springs; Nanjappa Bakthavachalam, Colorado Springs; Robert George Ducharme, Colorado Springs, all of Colo.

[73] Assignee: Digital Equipment Corporation, Maynard, Mass.

[21] Appl. No.: 751,126

[22] Filed: Nov. 15, 1996

[51] Int. Cl.⁶ ............................ H05K 5/02; H05K 7/18
[52] U.S. Cl. .................... 428/166; 428/132; 428/156; 428/138; 428/909; 248/636; 248/638; 312/97.02; 312/9.1; 360/97.02; 181/207; 181/208; 369/263; 361/685
[58] Field of Search .................................. 428/132, 156, 428/166, 138, 909; 248/636, 638; 312/9.1; 360/97.02; 181/207, 208; 369/263; 361/685

[56] References Cited

U.S. PATENT DOCUMENTS

| | | | |
|---|---|---|---|
| 1,918,149 | 7/1933 | Sullivan | 428/132 |
| 2,043,987 | 6/1936 | Brown | 428/132 |
| 3,547,274 | 12/1970 | Sosinkski | 211/26 |
| 3,559,813 | 2/1971 | Sosinkski | 211/26 |
| 4,012,089 | 3/1977 | Ward | 312/214 |
| 4,027,058 | 5/1977 | Wootten | 428/132 |
| 4,479,362 | 10/1984 | Rosenfeldt et al. | 455/602 |
| 4,663,240 | 5/1987 | Hadju et al. | 428/545 |
| 4,831,476 | 5/1989 | Branc et al. | 360/97.02 |
| 4,845,591 | 7/1989 | Pavie | 361/391 |
| 4,879,434 | 11/1989 | Assel et al. | 174/35 R |
| 5,021,905 | 6/1991 | Slecer | 360/97.02 |
| 5,081,551 | 1/1992 | Aruga | 360/97.01 |
| 5,214,549 | 5/1993 | Baker et al. | 360/97.02 |
| 5,235,482 | 8/1993 | Schmitz | 360/97.02 |
| 5,247,427 | 9/1993 | Driscoll et al. | 361/685 |
| 5,333,098 | 7/1994 | DeLuca et al. | 361/685 |
| 5,359,492 | 10/1994 | Porter | 361/683 |
| 5,422,767 | 6/1995 | Hatchett et al. | 360/98.01 |
| 5,431,974 | 7/1995 | Pierce | 428/45 |
| 5,469,311 | 11/1995 | Nishida et al. | 360/97.02 |
| 5,471,099 | 11/1995 | Larabell et al. | 307/53 |
| 5,483,423 | 1/1996 | Lewis et al. | 361/816 |
| 5,515,239 | 5/1996 | Kamerman et al. | 361/727 |
| 5,576,513 | 11/1996 | Gunther et al. | 174/35 R |

FOREIGN PATENT DOCUMENTS

| | | |
|---|---|---|
| 632455 A | 4/1995 | European Pat. Off. . |
| 763792 A | 3/1997 | European Pat. Off. . |

OTHER PUBLICATIONS

"Adjustment and Alignment Interconnect Technique for DASDS" IBM Technical Disclosure Bulletin, vol. 32, No. 7, Dec. 1, 1989.

"Interference Fit Positive DASD Grounding Strap" IBM Technical Disclosure Bulletin, vol. 34, No. 4A, Sep. 1, 1991.

*Primary Examiner*—William P. Watkins, III

[57] ABSTRACT

A composite shelf in a shelf frame supports a plurality of disk drives and attenuates vibrations in the shelf. In the composite shelf, there is a double wall having an outer wall and an inner wall for supporting the disk drives mounted on the shelf. A stiffener between the inner wall and outer wall strengthens the composite shelf to reduce flexure in the composite shelf when the shelf is loaded by disk drives mounted on the shelf. A damping layer is placed between the stiffener and one of the inner wall or outer wall. This damping layer attenuates vibrations in the composite shelf so as to reduce vibrations transmitted from the composite shelf to the disk drives supported by the composite shelf. A second damping layer is placed between the stiffener and the other wall. Both damping layers attenuate vibrations in the composite shelf so as to reduce vibrations transmitted from the composite shelf to the disk drives supported by the composite shelf. A third damping layer may be placed within the stiffener. The damping layers may be formed of adhesive damping layers, or a damping layer sandwiched between two adhesive layers. Alternatively, the stiffener is a spacer member between the inner wall and the outer wall.

20 Claims, 7 Drawing Sheets

ATTENUATING VIBRATIONS IN A MOUNTING SHELF FOR MULTIPLE DISK DRIVES

CROSS REFERENCE TO RELATED APPLICATIONS

Copending, commonly assigned patent applications: Ser. No. 08/751,127 filed Nov. 15, 1996 abandoned entitled HIGH FREQUENCY EMI SHIELD WITH AIR FLOW FOR ELECTRONIC DEVICE ENCLOSURE; Ser. No. 08/749,466 filed Nov. 15, 1996 pending entitled ANTI-SLAMMING LATCH APPARATUS FOR MODULAR COMPONENT INSTALLATIONS; and Ser. No. 08/749,465 filed Nov. 15, 1996 pending entitled TAB AND SLOT DISK DRIVE VIBRATION REDUCTION STRUCTURE all filed concurrently herewith, and incorporated herein by reference.

BACKGROUND OF THE INVENTION

1. Field of the Invention

This invention relates to attenuating the vibrations in a shelf frame on which a plurality of tape drives or disk drives are mounted. More particularly, the invention relates to a composite member in a shelf frame on which the drives may be mounted and where the composite member is structured both for strength and for reducing vibrations in the shelf frame and thereby reduce vibrations in the drives.

2. Description of the Related Art

Racks or shelves for mounting multiple disk drives in an array have been designed for strength and low cost. Vibrations in the rack, or in a shelf of the rack, caused by the disk drive mechanisms has not been a significant problem, to date. As disk drives became smaller, operating first with 9-inch disks, then 5¼-inch disks and 3½-inch and smaller disks, shock mounts for damping vibrations were eliminated from the disk drives because the drives were robust and were not susceptible to a vibration problem. However, as the recording density have increased and the revolutions per minute of the disks have increased, vibrations in the disk drives can give rise to vibrations in the shelves or in the mounting rack sufficient to cause read/write errors in the disk drives. For example, nine Gigabyte drives with 10,000 rpm disk speeds can create enough vibration that there is vibratory cross talk between drives mounted on the same shelf frame or cabinet. Especially with embedded servos alone being used in the disk drives to follow recorded tracks, vibrations in the mounting shelf frame may cause read/write errors in the disk drives.

Making the shelf frames stiffer is not a solution to the vibration problem. In fact, a stiffer shelf may vibrate at a resonant frequency corresponding to the desired disk speed for the disk drives. What is needed is a mounting shelf or shelf frame for the disk drives that has sufficient strength to support the drives and yet has damping properties to attenuate the vibrations in the shelf and shelf frame. This will decrease transmission of vibrations to the drives from sources external to shelf frame or shelf frame cabinet and from drives mounted on the shelf frame.

SUMMARY OF THE INVENTION

In accordance with this invention, the above problem has been solved by a composite shelf in a shelf frame for supporting a plurality of disk drives and for attenuating vibrations in the shelf. In the composite shelf, there is a double wall having an outer wall and an inner wall for supporting the disk drives mounted on the shelf. A stiffener between the inner wall and outer wall strengthens the composite shelf to reduce flexure in the composite shelf when the shelf is loaded by disk drives mounted on the shelf. A damping layer is placed between the stiffener and one of the inner wall or outer wall. This damping layer attenuates vibrations in the composite shelf so as to reduce vibrations transmitted from the composite shelf to the disk drives supported by the composite shelf.

As a further feature of the invention, a second damping layer is placed between the stiffener and the other wall. Both damping layers attenuate vibrations in the composite shelf so as to reduce vibrations transmitted from the composite shelf to the disk drives supported by the composite shelf. As another feature of the invention a third damping layer is placed within the stiffener. In one embodiment of the invention, the damping layers are adhesive damping layers. In another embodiment the damping layers are a damping layer sandwiched between two adhesive layers.

In another embodiment of the invention the stiffener is a spacer member between the inner wall and the outer wall. The spacer member is a lanced tab lanced from one of the inner or outer walls and the tab is folded to have an arm adjacent to the other of the inner or outer walls. The spacer member may also be a hat shaped member attached to one of the inner or outer walls and having a surface adjacent to the other of the inner or outer walls.

As another feature of the invention a shelf frame for supporting a plurality of disk drives and for attenuating vibrations in the shelf frame, said shelf frame is constructed with a top composite shelf, a bottom composite shelf and two side walls connected between the top composite wall and the bottom composite. Each of the top and bottom composite walls has a double wall having an outer wall and an inner wall. A filler between the inner and outer wall strengthens the composite shelf to reduce flexure in the composite shelf when the shelf is loaded by disk drives mounted on the shelf. There is a first damping layer between the filler and one of the inner wall or outer wall and a second damping layer between the filler and another of the inner or outer wall. The and second damping layers attenuate vibrations in the composite shelf so as to reduce vibrations transmitted from the composite shelves to the disk drives supported in the shelf frame.

In another embodiment of the invention, the bottom composite shelf has a filler between the inner and outer wall strengthening the composite shelf, and the top composite shelf has a spacer member between the inner and outer wall to strengthening the composite shelf.

The great advantage of the present invention is that the invention protects the read/write head actuator arm in a disk drive from being moved off-track due to vibrations external to the drive. Further, the invention protects the drive from vibrations created by other drives on the shelf frame or vibrations created by vibration sources external to the shelf frame.

The foregoing and other features, utilities and advantages of the invention will be apparent from the following more particular description of a preferred embodiment of the invention as illustrated in the accompany drawings.

DETAILED DESCRIPTION OF THE PREFERRED EMBODIMENTS

Figure 1A:
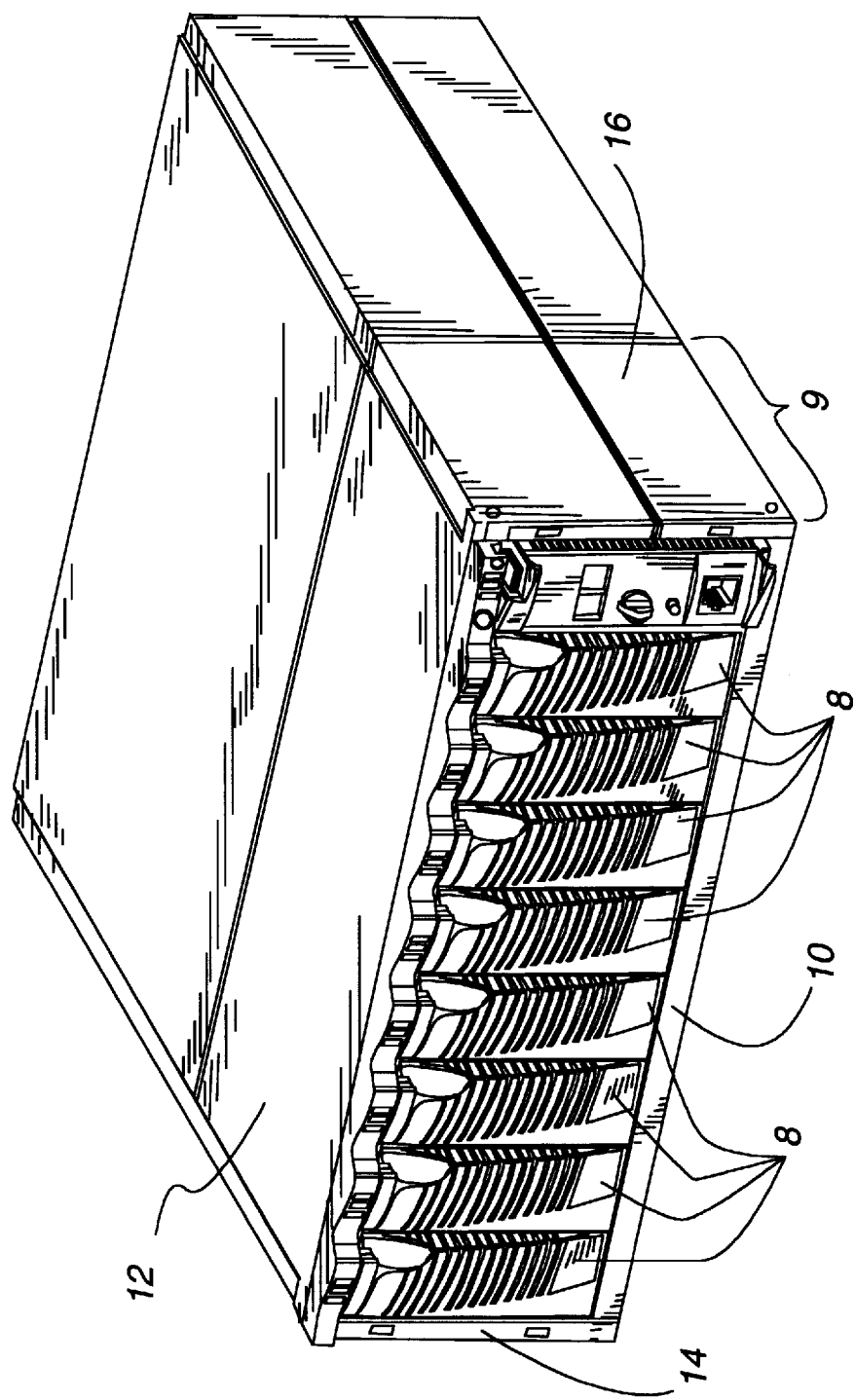
FIG. 1A shows a disk drive shelf frame that uses composite shelf members in accordance with the invention, the disk drive shelf frame housing a plurality of disk drives with mounting hardware.
Figure 1B:
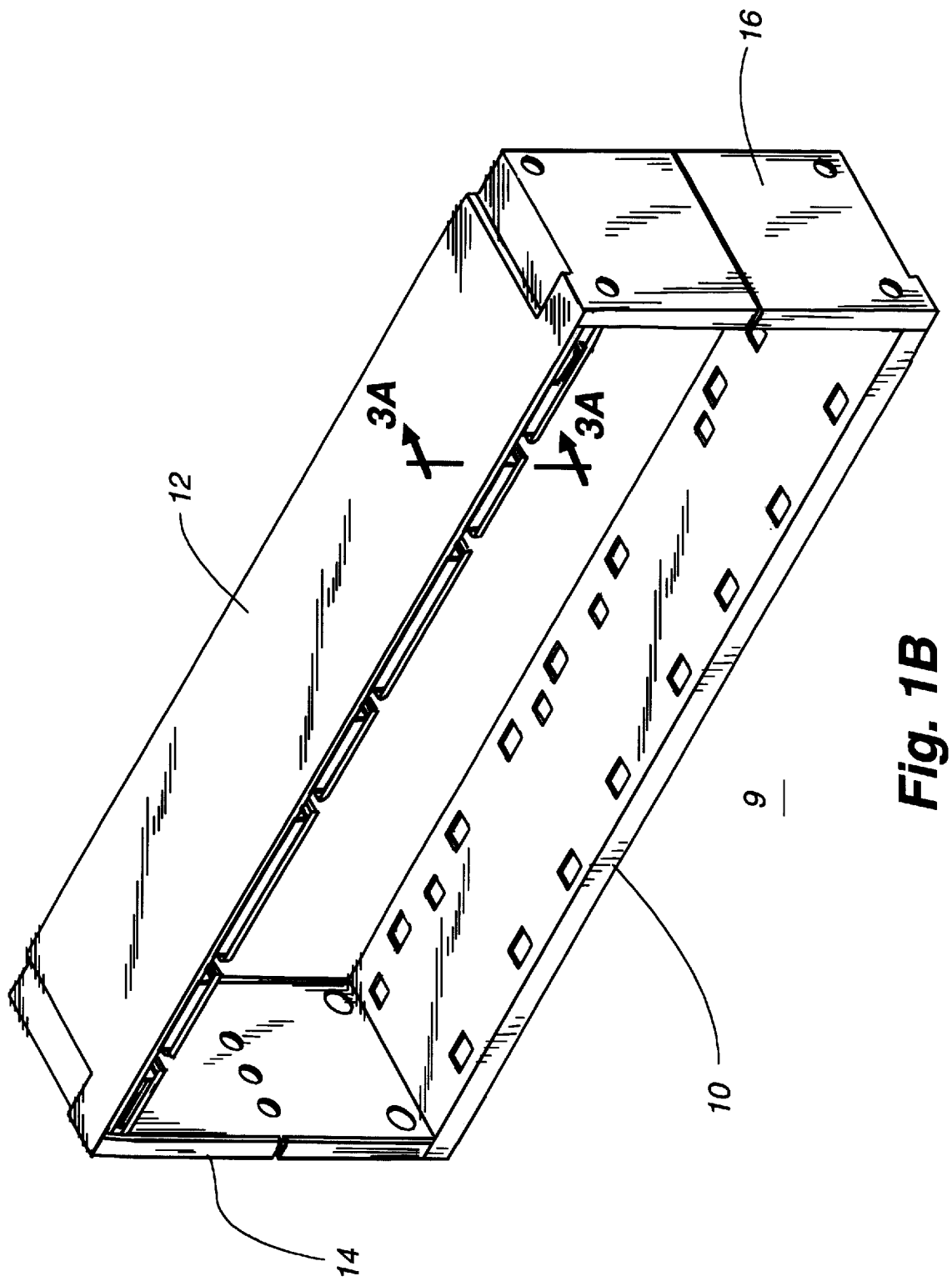
FIG. 1B shows the forward portion of the disk drive shelf frame of FIG. 1A.

In FIG. 1A, a plurality of disk drives 8 are mounted in a shelf frame. The forward portion 9 of the entire shelf frame is the portion on which drives are mounted and is hereinafter referred to as the shelf frame. The shelf frame has two composite shelves, bottom shelf 10 and top shelf 12, and double side walls 14 and 16. FIG. 1B shows the shelf frame 9 in FIG. 1A with the disk drives removed. Shelf frame 9 contains a bottom shelf 10, a top shelf 12, and sidewalls 14 and 16. In the preferred embodiment, shelves 10 and 12 and sidewalls 14 and 16 have double metal walls. Also, in the preferred embodiment, bottom shelf 10 and top shelf 12 have a plastic filler/stiffener between the inner and outer metal walls.

Figure 2:
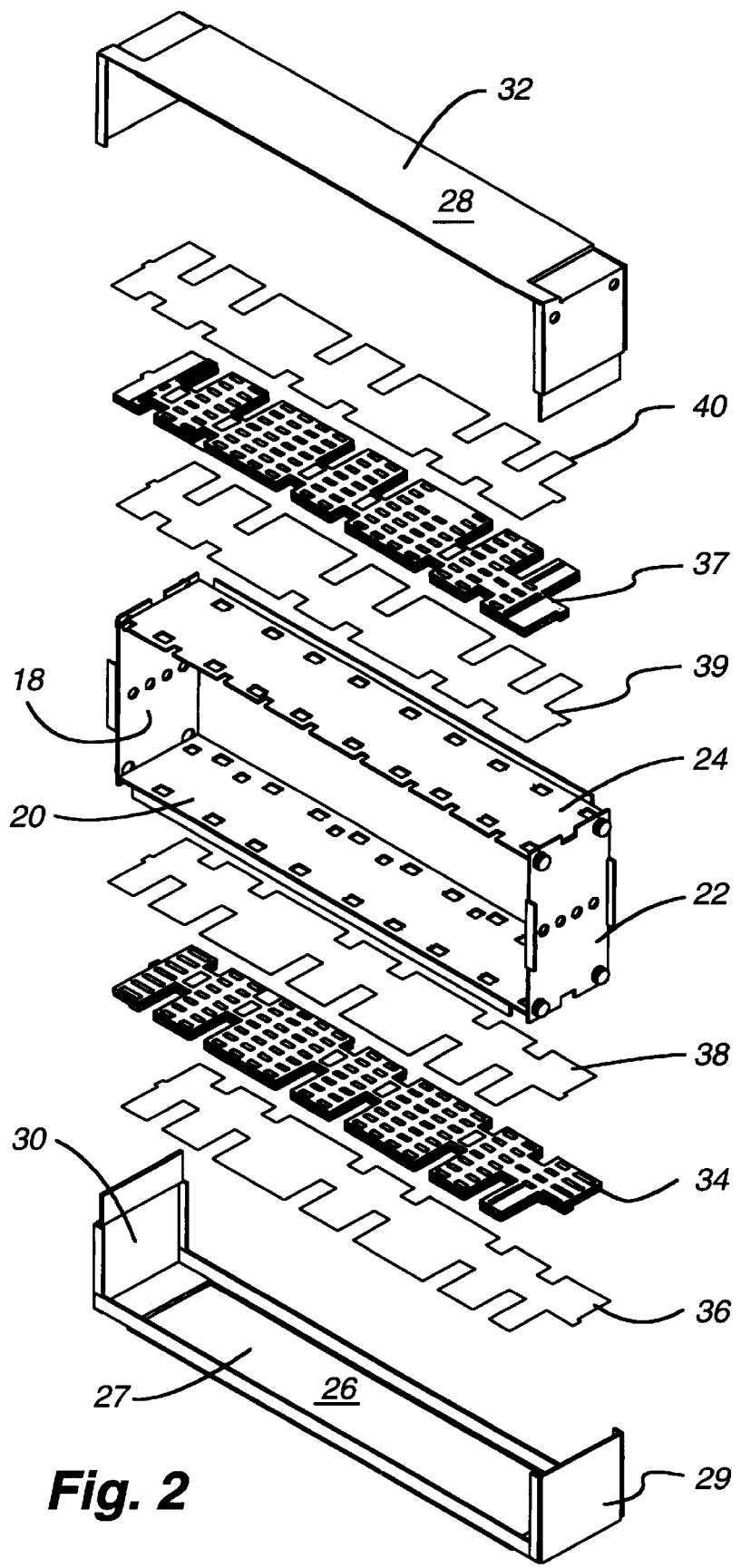
FIG. 2 is an exploded view of the shelf frame in FIG. 1B illustrating an embodiment of the invention where both the top and bottom shelves of the shelf frame are composite shelves.

FIG. 2 shows the shelf frame of FIG. 1B in exploded view. The inner walls 18, 20, 22, and 24, are fastened together to form a box frame. Each of the walls of this inner box frame have their edges folded to provide added strength to help prevent the walls from flexing under load. The outer walls for the shelf frame are constructed as two U-shaped cover pieces 26 and 28. Bottom cover piece 26 has side walls 29 and 30. The bottom cover 26 then fits over the bottom half of the inner frame with a bottom wall 27 forming a double wall with lower wall 20 of the inner frame. Likewise, sidewall 29 forms a double wall with one-half of sidewall 22, while sidewall 30 forms one-half of a double side wall with side wall 18. The edges of the walls in bottom cover piece 26 are folded to give the walls additional strength. The upper cover piece 28 is similarly structured and slides down over the top wall 24 of the inner frame to form the double wall structure on the top one-half of the shelf frame. The side walls of the outer cover pieces 26 and 28 are fastened to the side walls 18 and 22 of the inner frame.

Between the bottom inner wall 20 and bottom outer wall 27, a filler/stiffener 34 is inserted. The filler provides structural stiffness and strength for the bottom composite shelf 10 (FIG. 1B). In addition, acrylic damping layers 36 and 38 are attached between stiffener 34 and the outer wall 27 and the inner wall 20, respectively. The acrylic damping layers 36 and 38 in the preferred embodiment are adhesive layers and serve to adhere the filler 34 to the metal walls 20 and 27. These acrylic damping, or acrylic adhesive, layers 36 and 38 provide the vibration damping characteristics for the lower composite shelf.

The upper composite shelf has the same structure as the lower composite shelf. The filler/stiffener layer 37 is attached to the inner wall 24 by acrylic/adhesive layer 39. Similarly, acrylic/adhesive layer 40 bonds the outer top wall 32 to the filler/stiffener 37. Thus, when assembled, the shelf frame has a composite bottom shelf and a composite top shelf.

The acrylic adhesive layers 36, 38, 39 and 40 are preferably ISD 112 available from 3M Company. Vertical flexure of the shelf, i.e. in a direction across the layers of the shelf, or twisting flexure of the shelf will put the acrylic adhesive layers into shear stress. During shelf flexure the inner wall 20 and the outer wall 27 will want to move laterally relative to the filler/stiffener 34. The acrylic adhesive layers will attenuate the flexure vibrations. The damping properties of the acrylic adhesive layers depend on the temperature of operation of the shelf frame containing the disk drives. The acrylic adhesive layers should have a loss factor of approximately 1 in the operating temperature range of 10° to 60° Centigrade and over a frequency range of 60 to 170 Hz. The acrylic adhesive material is a cross-linked polymer; it will not flow and creep. A deformation caused by static load stabilizes rapidly. Bond strength for the adhesive is about 3 psi.

Another adhesive that could be used for adhesive layers 36, 38, 39 and 40 is 3M-VHB available from the 3M Company. This adhesive is also an effective damping material when used in the composite shelf.

Figure 3A:
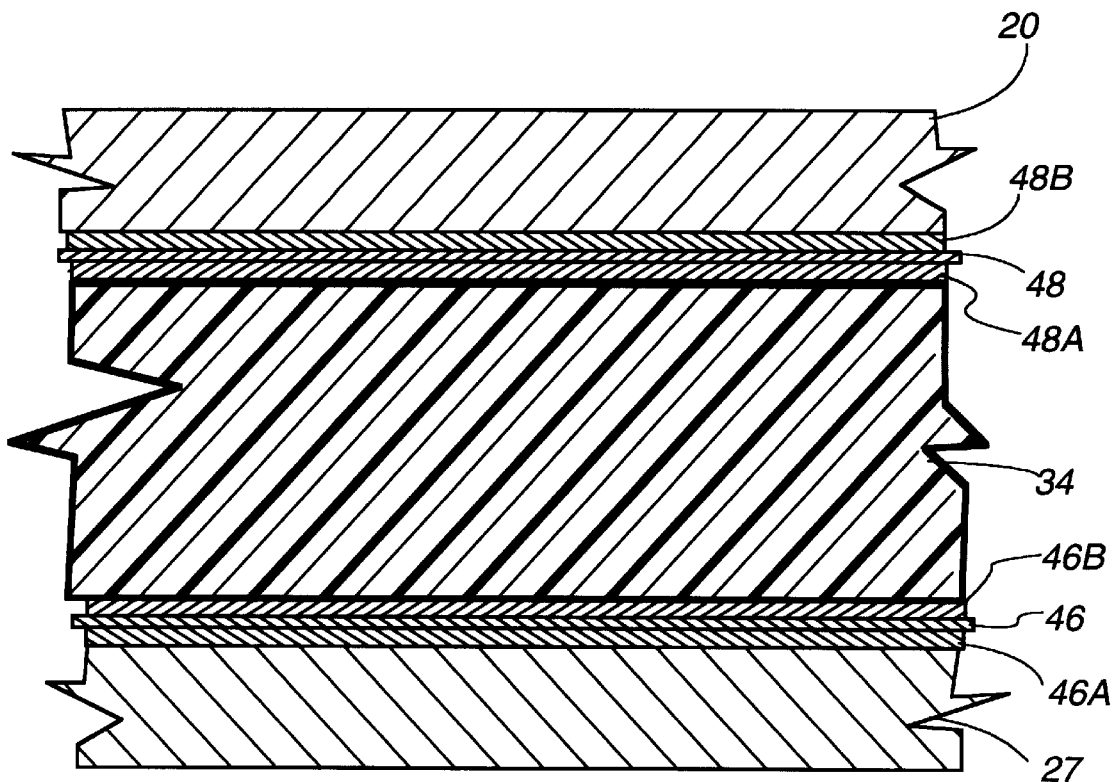
FIG. 3A is a cross-section of one embodiment of a composite shelf and illustrates layers making up the composite shelf.

FIG. 3A shows another embodiment of a composite shelf in cross section. In this embodiment there is a damping layer separate from adhesive layers which bond the damping layer to stiffener and to inner and outer shelf walls. The outer wall 27 is adhesively bonded to damping layer/material 46 by adhesive layer 46A. The filler/stiffener 34 is adhesively bonded to damping layer 46 by adhesive 46B. Similarly, the inner wall 20 is adhesively bonded to damping layer 48 by adhesive layer 48B. The damping layer 48 is adhesively bonded to filler 34 by adhesive layer 48A.

The filler/stiffener 34 is preferably a molded plastic material chosen for its flexure modulus at the desired operative range of temperature for shelf frame containing the disk drives. The filler/stiffener 34 preferably has a flexural modulus in the range of 700 to 900 Kpsi at an operative temperature between 10° to 60° Centigrade. The material is preferably a low cost plastic material that may be injection molded to the desired shape for the filler.

Figure 3B:
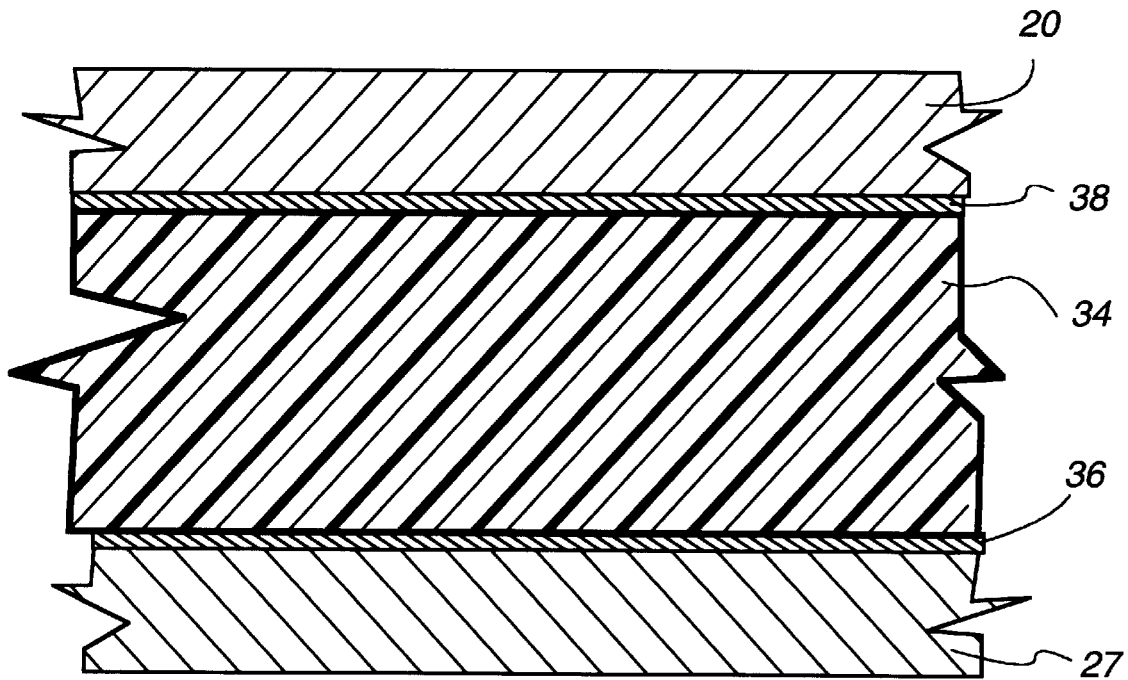
FIG. 3B is a cross-section of another embodiment of the composite shelf and illustrates layers making up the composite shelf in FIG. 2.

FIG. 3B shows the lower composite shelf in FIG. 2 in cross section. Inner frame 20 is bonded to filler stiffener 34 by adhesive damping layer 38. Outer wall 27 is bonded to filler stiffener 34 by adhesive layer damping layer 36. Adhesive layers 36 and 38 are preferably ISD 112 or VHB adhesive. Both of these materials are available from 3M Company, as discussed above.

Figure 4A:
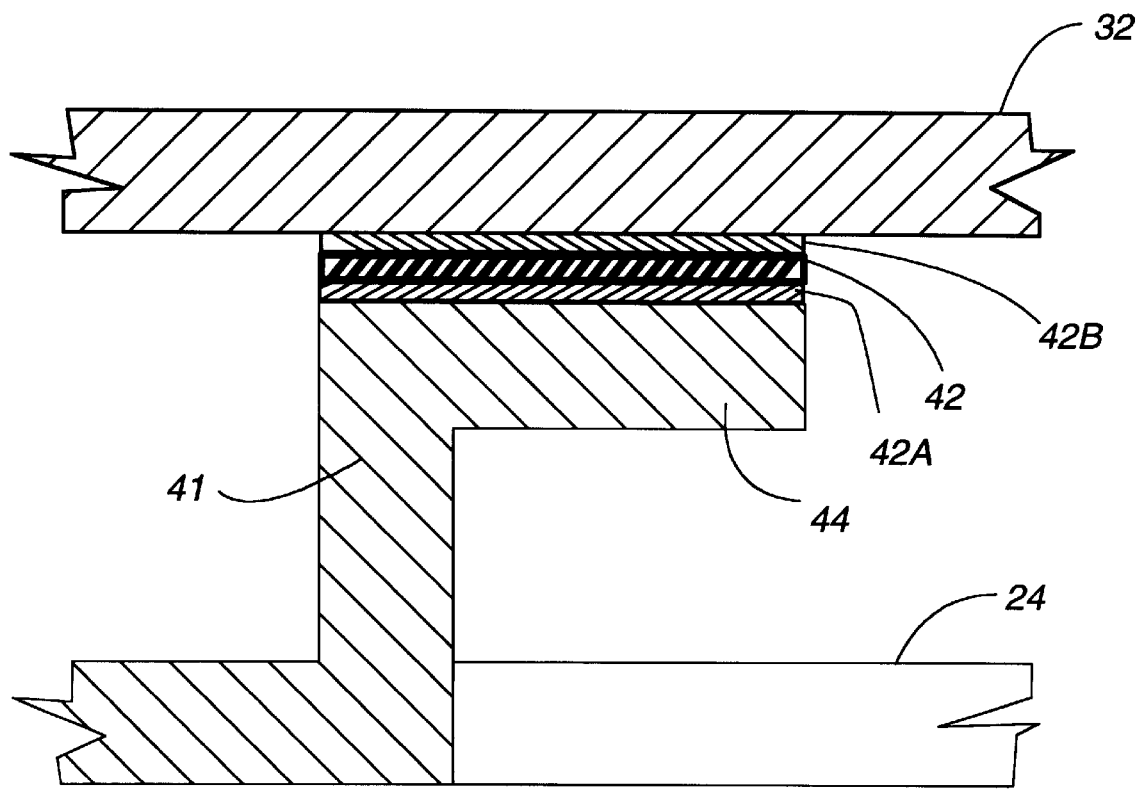
FIG. 4A illustrates an alternative embodiment for the top shelf in the shelf frame in FIG. 1B where there is a spacer member and damping material with adhesive between the walls of the shelf.

In an alternative embodiment of the invention. The upper, or top shelf, is damped by using only the acrylic damping material at selected locations between the outer top wall 32 and the inner top wall 24. As shown in FIG. 4A, the inner top wall 24 has a L-shaped spacer, or lanced tab which reaches up towards the outer top wall 32. The L-shaped spacer is cut and folded from the inner wall 24. Arm 44 of the L-shaped spacer is positioned parallel and adjacent to the inner surface of outer top wall 32. The acrylic damping material 42 is bonded with adhesive layers 42A and 42B between the arm 44 and the outer top wall 32. Again, the damping layer (damping material with the adhesive layers) will damp vibrations in the top double wall 12 (FIG. 1).

Figure 4B:
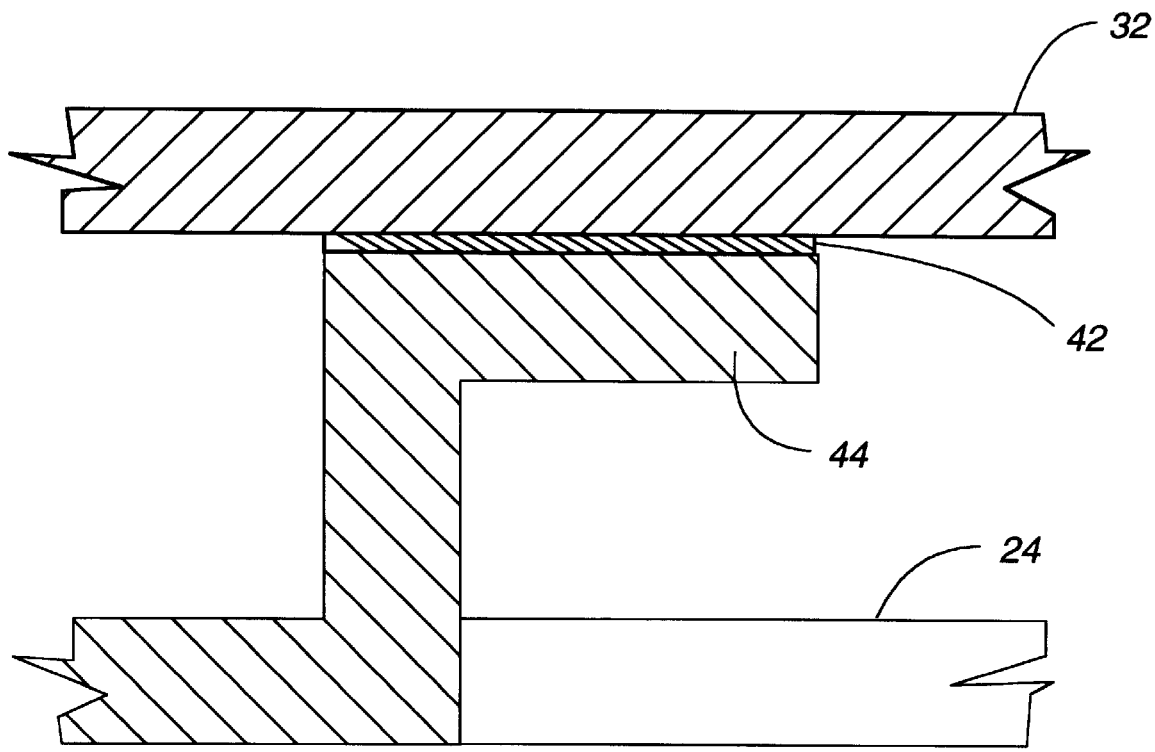
FIG. 4B illustrates an alternative embodiment for the top shelf in the shelf frame in FIG. 1B where there is a spacer member and damping adhesive between the walls of the shelf.

FIG. 4B shows an alternative embodiment of the invention where the top shelf uses lanced tabs from the inner frame which are adhesively bonded by adhesive layer 42 to the outer wall 32. As discussed above for FIG. 4A, the lanced tabs are cut from the inner wall 24 and folded, or bent, into the L-shaped spacing member 44.

The structure in FIG. 4A or FIG. 4B is not as strong as that in FIG. 3B. On the other hand, most of the load in carrying the disk drives is borne by the bottom composite shelf constructed as shown in FIG. 3B. By using the composite wall in FIG. 3B for the bottom shelf of the rack and using the double wall with spacers and damping layers, as shown in FIG. 4A or 4B, the cost of the disk drive mounting frame or rack is reduced while preserving nearly the same strength and damping characteristics.. Accordingly, using a bottom shelf as shown in FIG. 3B and a top shelf as shown in FIG. 4A or 4B can provide a effective and lower cost shelf frame with good vibration damping characteristics.

Figure 5:
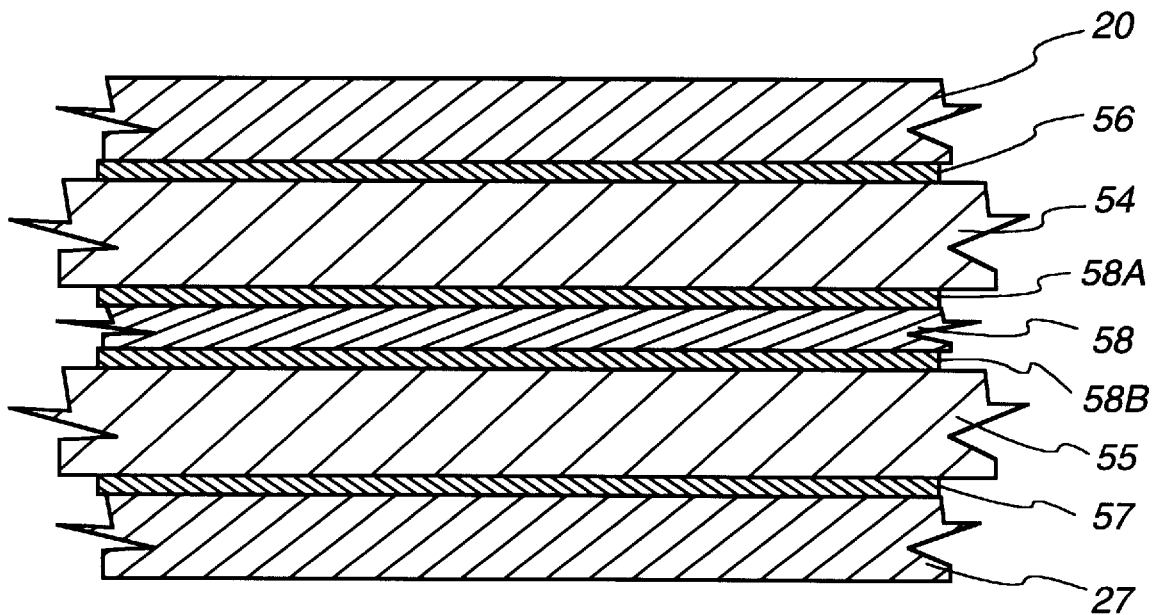
FIG. 5 shows a composite shelf where there are two stiffener layers separated by a damping layer.

In another preferred embodiment of the invention, the composite shelf is constructed of layers, as shown in cross section in FIG. 5. In this embodiment, the filler stiffener is provided as two separate layers 54 and 55. Stiffener 54 is adhesively bonded to inner wall 20 by a damping adhesive layer 56. Similarly, stiffener 55 is bonded to outer wall 27 by damping adhesive layer 57. Between stiffener 54 and stiffener 55, there is a damping layer 58 which is bonded to the stiffeners by adhesive layers 58A and 58B.

Choices for the damping layer 58 are C-1002 available from the EAR Company or Sorbothane 30 durometer available from Sorbothane, Inc. The adhesive layers 56, 57, 58A and 58B are preferably 3M VHB.

Figure 6:
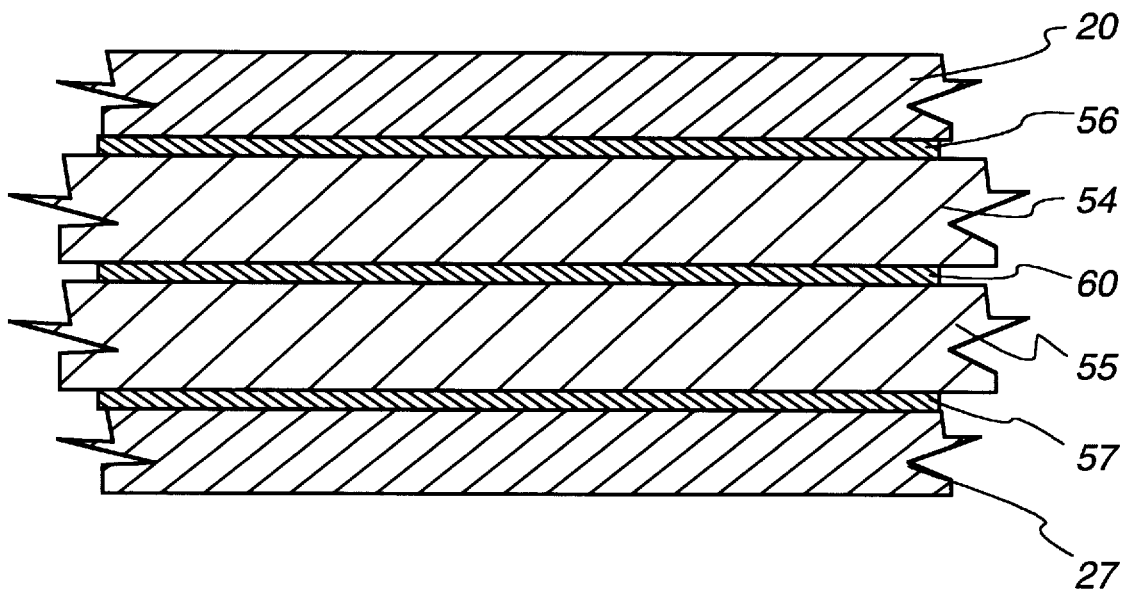
FIG. 6 shows a composite shelf where there are two stiffener layers separated by an adhesive damping layer.

FIG. 6 shows another preferred embodiment for the composite shelf where two stiffener layers 54 and 55 are again used. These stiffener layers 54 and 55 are adhesively bonded to inner wall 20 and outer wall 27, respectively, by damping adhesive layers 56 and 57. Stiffeners 54 and 55 are bonded to each other by damping adhesive layer 60. Damping adhesive layers 56, 57, and 60 are ISD 112 acrylic damping adhesive available from 3M Company. Alternatively, these adhesive layers could be another adhesive material such as VHB, also available from 3M Company.

Figure 7:
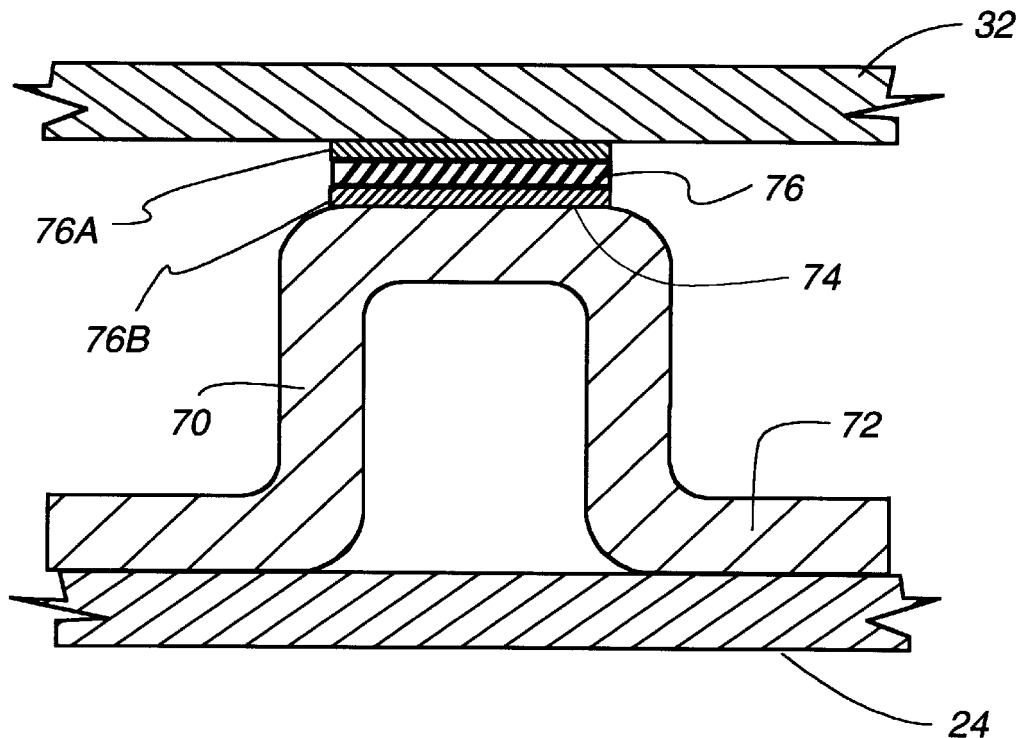
FIG. 7 shows a top shelf where the spacer member is a hat shaped member with a damping layer between the spacer and the outer wall.

In another preferred embodiment of the invention, the top shelf using spacer members is constructed of hat-shaped spacer members, as shown in FIG. 7. Hat spacer member 70, has the base rim 72 of the hat fastened to the inner wall 24. The spacer member may be fastened to wall 24 by spot welding or adhesive. Between the top of the hat 74 and the outer wall 32 a damping material 76 is inserted. The damping material 76 is adhesively bonded to outer wall 32 by adhesive layer 76A. Damping material 76 is bonded to the top 74 of the hat spacer member 70 by adhesive layer 76B. The top shelf in FIG. 7 does not carry the load that a bottom, or lower composite shelf, would have to carry, and thus the spacer members with damping layer 76 are an effective low-cost alternative for a top composite shelf.

Figure 8:
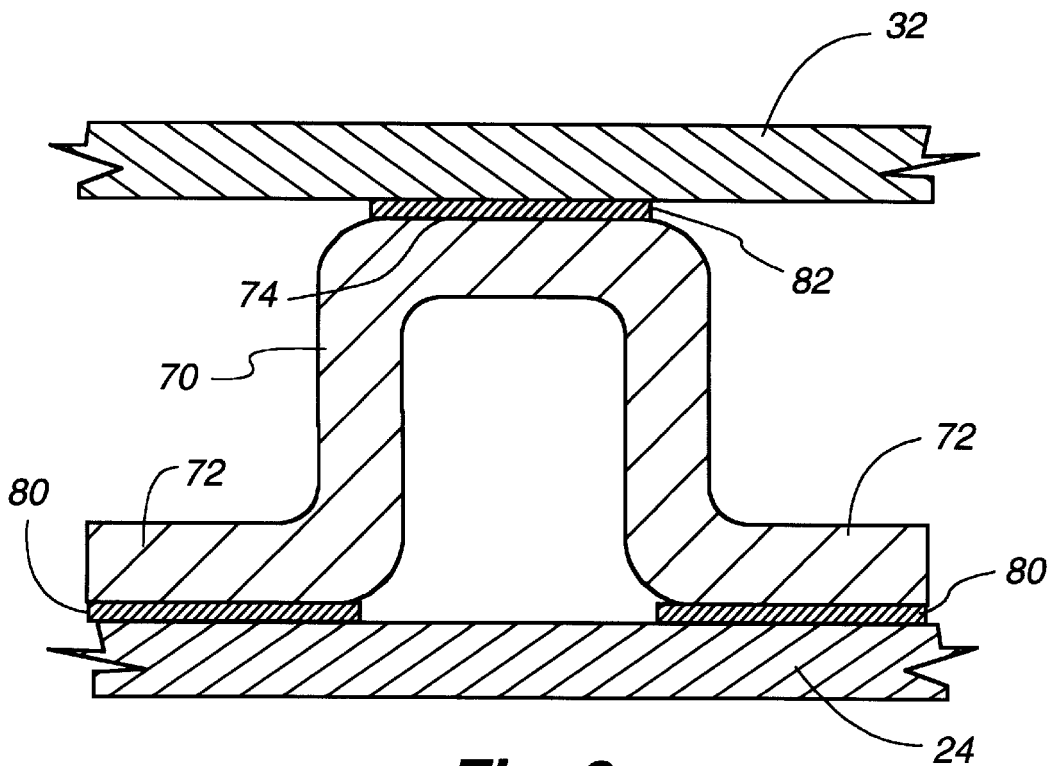
FIG. 8 shows a top shelf where the spacer member is a hat shaped member with an adhesive damping layer between the spacer and both the inner wall and the outer wall.

FIG. 8 illustrates another embodiment of a top shelf using a hat spacer member 70. In FIG. 8, the inner wall of the top shelf is adhesively bonded to the rim 72 of the hat by using adhesive damping layer 80. The top 74 of hat spacer member 70 is adhesively bonded to the outer wall 32 by damping adhesive layer 82. Damping adhesive layers 80 and 82 are preferably 3M ISD 112. Alternatively, the adhesive layers 80 and 82 could be 3M VHB adhesive.

Transmissibility of vibrations from the shelf frame support to top and bottom shelves where both shelves are composite shelves, as shown in FIG. 3B, have been measured. The transmissibility is defined as the ratio of output signal to the input signal. The signals are either accelerations or force due to vibrations measured at selected locations.

The transmissibilities of vibration between the support and the disk drives mounted in these type of composite shelves have been measured and given the following results. Measurements also show the transmissibilities between the support and the shelves.

| Item | Location | Transmissibility |
| --- | --- | --- |
| Storage Shelf | Top, front | 1.5 to 8.0 |
| Storage Shelf | Bottom, front | 1.2 to 6.0 |
| Disk Drives | Top, front | 4.6 to 8.0 |
| Disk Drives | Top, rear | 2.29 to 2.72 |

The utility of the present invention is that a disk drive in a storage system using the present invention will function free of errors caused by vibrations external to the disk drive.

While the invention has been particularly shown and described with reference to a preferred embodiment thereof, it will be understood by those skilled in the art that various other changes in form and details may be made therein without departing from the spirit and scope of the invention.

What is claimed is:

1. A composite shelf in a shelf frame for supporting a plurality of disk drives and for attenuating vibrations in the shelf, said composite shelf comprising:

a double wall having an outer wall and an inner wall and supporting the disk drives mounted on the shelf;

a stiffener between the inner wall and the outer wall strengthening the composite shelf to reduce flexure in the composite shelf when the shelf is loaded by disk drives mounted on the shelf;

a first damping layer between the stiffener and one of the inner wall or outer wall; and said first damping layer attenuating vibrations in the composite shelf so as to reduce vibrations transmitted from the composite shelf to the disk drives supported by the composite shelf.

2. The composite shelf of claim 1 and in addition:

a second damping layer between the stiffener and another of the inner or outer wall; and said first and second damping layers attenuating vibrations in the composite shelf so as to reduce vibrations transmitted from the composite shelf to the disk drives supported by the composite shelf.

3. The composite shelf of claim 2 wherein said first and second damping layers are adhesive damping layers.

4. The composite shelf of claim 2 wherein said first and second damping layers comprise:

a damping layer;

an adhesive layer bonding the damping layer to a wall; and an adhesive layer bonding the damping layer to said stiffener.

5. The composite shelf of claim 2 and in addition a third damping layer within said stiffener.

6. The composite shelf of claim 5 wherein said first, second and third damping layers are adhesive damping layers.

7. The composite shelf of claim 5 wherein said first, second and third damping layers comprise:

a damping layer;

an adhesive layer bonding the damping layer to a wall; and an adhesive layer bonding the damping layer to said stiffener.

8. The composite shelf of claim 5 wherein:

one or more of said first, second and third damping layers comprises a damping layer, a first adhesive layer bonding the damping layer to a wall or stiffener, and a second adhesive layer bonding the damping layer to said stiffener; and any remaining damping layers are adhesive damping layers.

9. The composite shelf of claim 1 wherein said stiffener is a spacer member between said inner wall and said outer wall.

10. The composite shelf of claim 9 wherein said spacer member is a lanced tab lanced from one of the inner or outer walls and folded to have an arm of the tab adjacent to the other of the inner or outer walls.

11. The composite shelf of claim 10 wherein said first damping layer is an adhesive damping layer.

12. The composite shelf of claim 10 wherein said first damping layer comprises:

a damping layer;

an adhesive layer bonding the damping layer to said other of the inner or outer walls; and an adhesive layer bonding the damping layer to said lanced tab.

13. The composite shelf of claim 9 wherein said spacer member is a hat shaped member attached to one of the inner or outer walls and having a surface adjacent to the other of the inner or outer walls.

14. The composite shelf of claim 13 wherein said first damping layer is an adhesive damping layer bonding said surface to the other of the inner or outer walls.

15. The composite shelf of claim 13 wherein said hat shaped member is attached with an adhesive damping layer to said one of the inner or outer walls.

16. The composite shelf of claim 13 wherein said first damping layer comprises:

a damping layer;

an adhesive layer bonding the damping layer to said other of the inner or outer walls; and an adhesive layer bonding the damping layer to said surface of the hat shaped member.

17. A shelf frame for supporting a plurality of disk drives and for attenuating vibrations in the shelf frame, said shelf frame comprising:

a top composite shelf having a filler layer and a damping layer;

a bottom composite shelf having a filler layer and a damping layer;

first and second side walls connecting said top composite wall and said bottom composite wall; and said top composite wall and said bottom composite wall attenuating vibrations in the shelf frame so as to reduce the transmission of vibrations between disk drives mounted in the shelf frame and the transmission of vibrations to the disk drives from a source external to the shelf frame.

18. The shelf frame of claim 17 wherein said top composite shelf and said bottom composite shelf each comprise:

a double wall having an outer wall and an inner wall and supporting the disk drives mounted on the shelf;

a filler between the inner wall and the outer wall strengthening the composite shelf to reduce flexure in the composite shelf when the shelf is loaded by disk drives mounted on the shelf;

a first damping layer between the filler and one of the inner wall or outer wall;

a second damping layer between the filler and another of the inner or outer wall; and said first and second damping layers attenuating vibrations in the composite shelf so as to reduce vibrations transmitted from the composite shelves to the disk drives supported in the shelf frame.

19. The shelf frame of claim 17 wherein:

said bottom composite shelf comprises:

a double wall having an outer wall and an inner wall;

a filler between the inner wall and the outer wall strengthening the composite shelf to reduce flexure in the composite shelf when the shelf is loaded by disk drives mounted on the shelf;

a first damping layer between the filler and one of the inner wall or outer wall;

a second damping layer between the filler and another of the inner or outer wall; and said first and second damping layers attenuating vibrations in the composite shelf so as to reduce vibrations transmitted from the bottom composite shelf to the disk drives supported in the shelf and frame; and and said top composite shelf comprises:

a double wall having an outer wall and an inner wall;

a spacer member between the inner wall and the outer wall strengthening the composite shelf to reduce flexure in the top composite shelf; and a first damping layer between the spacer member and one of the inner wall or outer wall of the top composite shelf.

20. The shelf frame of claim 19 and wherein said top composite shelf further comprises:

a second damping layer between the spacer member and another of the inner or outer wall; and said first and second damping layers attenuating vibrations in the top composite shelf so as to reduce vibrations transmitted from the top composite shelf to the disk drives supported by the shelf frame.

* * * * *